(12) United States Patent
Wang

(10) Patent No.: US 11,506,237 B2
(45) Date of Patent: Nov. 22, 2022

(54) FITTABLE AND RELEASABLE FASTENER

(71) Applicant: FIVETECH TECHNOLOGY INC., New Taipei (TW)

(72) Inventor: Ting-Jui Wang, New Taipei (TW)

(73) Assignee: FIVETECH TECHNOLOGY INC., New Taipei (TW)

(*) Notice: Subject to any disclaimer, the term of this patent is extended or adjusted under 35 U.S.C. 154(b) by 407 days.

(21) Appl. No.: 16/878,687

(22) Filed: May 20, 2020

(65) Prior Publication Data

US 2020/0277981 A1  Sep. 3, 2020

Related U.S. Application Data

(63) Continuation-in-part of application No. 16/505,768, filed on Jul. 9, 2019, now Pat. No. 11,162,524.

(30) Foreign Application Priority Data

Jul. 13, 2018 (TW) .................................. 107124397

(51) Int. Cl.
*F16B 31/02* (2006.01)

(52) U.S. Cl.
CPC ............ *F16B 31/027* (2013.01); *F16B 31/02* (2013.01)

(58) Field of Classification Search
CPC ...... F16B 19/109; F16B 21/165; F16B 31/02; F16B 31/027; F16B 39/32

USPC .......................................... 411/1, 6, 298, 348
See application file for complete search history.

(56) References Cited

U.S. PATENT DOCUMENTS

| | | | | |
|---|---|---|---|---|
| 2,373,812 A | * | 4/1945 | Coop | B25B 23/142 411/6 |
| 2,729,134 A | * | 1/1956 | Stanton, Jr. | F16B 31/02 411/6 |
| 2,745,303 A | * | 5/1956 | Corenelius | B25B 5/16 411/6 |
| 2,881,602 A | * | 4/1959 | Baker | F16K 31/60 464/35 |
| 3,255,796 A | * | 6/1966 | Tobey | F16B 39/32 411/298 |

* cited by examiner

*Primary Examiner* — Roberta S Delisle
(74) *Attorney, Agent, or Firm* — Schmeiser, Olsen & Watts, LLP

(57) ABSTRACT

A fittable and releasable fastener includes a head which has a fitted and released portion and a fastening portion; and a fitting and releasing piece which has a fitting and releasing portion. Accordingly, when the fitting and releasing portion fits to the fitted and released portion, an external turning force is applied to the fitting and releasing piece or the head to make the fastening portion combine with at least one object. After the fastening portion is combined with the object, the fitting and releasing portion would release the fitted and released portion to limit the force or the force interval applied on the fastening portion for preventing excessively locking if the force is continuously applied.

16 Claims, 7 Drawing Sheets

FITTABLE AND RELEASABLE FASTENER

CROSS-REFERENCE TO RELATED APPLICATION

This application is a continuation-in-part patent application of U.S. application Ser. No. 16/505,768 filed on Jul. 9, 2019, which claims priority to Patent Application No(s). 107124397 filed in Taiwan, R.O.C. on Jul. 13, 2018, the entire contents both of which are hereby incorporated by reference for which priority is claimed under 35 U.S.C. § 120.

BACKGROUND OF THE INVENTION

1. Field of the Invention

The present disclosure relates to a fittable and releasable fastener, and in particular to a fittable and releasable fastener which can be used to combine at least one object, and prevent excessively locking.

2. Description of the Related Art

When at least one object is combined, the combination of object is generally locked by screws.

Generally, the screws are screwed into an object by using a screwdriver for combination. However, when using a screwdriver to perform the locking, a user often turns the screws continuously after the screws are screwed into the object because the user worries that the locking is not secure. It may cause that the object is damaged by the excessive locking or the screw may get stripped.

Thus, it is desirable to have a fittable and releasable fastener which can prevent excessively locking that is to be actively disclosed by the invention.

BRIEF SUMMARY OF THE INVENTION

An objective of the present disclosure is to provide a fittable and releasable fastener, and in particular to a fittable and releasable fastener which can limit the force or the force interval applied on the fastening portion to prevent excessively locking.

To achieve at least the above objective and other objectives, a first aspect of the present disclosure provides a fittable and releasable fastener, comprising: a head and a fitting and releasing piece. The head has at least one fitted and released portion and a fastening portion. The head has a limiting portion, and the limiting portion combines moveably with a corresponding limiting portion provided by a body portion. The fitting and releasing piece has at least one fitting and releasing portion, and the fitting and releasing portion fits to the fitted and released portion. The fitting and releasing piece or the head is applied with an external force to make the fitting and releasing portion release the fitted and released portion for limiting the force or the force interval applied on the fastening portion.

In an embodiment, the fitting and releasing portion or the fitted and released portion comprises an elastomer and a pusher.

In an embodiment, the fitting and releasing portion or the fitted and released portion has a fitting and releasing surface and a stopping surface, a direction of the fitting and releasing surface is fittably and releasably turning, and a direction of the stopping surface is restrained from turning.

In an embodiment, the pusher is an arc surface body, spherical body or curved surface body, and the pusher can be driven or turned by a less force along a bevel, curved surface or arc surface of the fitting and releasing surface.

In an embodiment, the stopping surface is a vertical surface, step surface or a bevel, curved surface or arc surface with an angle larger than that of the fitting and releasing surface for stopping and restraining the pusher from turning, or restraining the pusher from moving with a force larger than that of the pusher driving the fitting and releasing surface.

In an embodiment, when the force is applied to the head to drive the fastening portion for the locking or fastening, the fitting and releasing portion releases the fitted and released portion along a fitting and releasing surface before the torque force or turning force applied to the fastening portion is larger than a bearable structural force on the corresponding fastened portion to prevent the corresponding fastened portion from being damaged by the fastening portion or failure.

In an embodiment, when the force is applied to the head to drive the fastening portion for removing the locking or fastening, the fitting and releasing portion abuts against a stopping surface so that the torque force or turning force applied to the fastening portion is transferred to the stopping surface by the fitting and releasing portion for removing the locking or fastening of the fastening portion to the corresponding fastened portion.

In an embodiment, when the force is applied to the head to drive the fastening portion for removing the locking or fastening, the fitting and releasing portion abuts against a stopping surface so that the torque force or turning force applied to the fastening portion is transferred to the stopping surface by the fitting and releasing portion, the force transferred to the stopping surface is larger than the fitting and releasing force of entering for lockably fastening or turnably fastening the fitting and releasing portion and the fitted and released portion in another direction, for removing the locking or fastening of the fastening portion to the corresponding fastened portion.

In an embodiment, when the force is applied to the head to drive the fastening portion for removing the locking or fastening, the fitting and releasing portion releases the fitted and released portion along a fitting and releasing surface before the torque force or turning force applied to the fastening portion is larger than the predetermined force on the fastening portion.

A second aspect of the present invention provides a fittable and releasable fastener, comprising a head and a fitting and releasing piece. The head has at least one fitted and released portion and a fastening portion; and the fitting and releasing piece has at least one fitting and releasing portion, and the fitting and releasing portion fits to the fitted and released portion, the fitting and releasing piece or the head is applied with an external force to make the fitting and releasing portion release the fitted and released portion for limiting the force or the force interval applied on the fastening portion, the fastening portion is used to fasten a corresponding fastened portion, and when the force is applied to the head to drive the corresponding fastened portion, the fitting and releasing portion releases the fitted and released portion before the torque force or turning force applied to the fastening portion is larger than a bearable or predetermined structural force on the corresponding fastened portion.

A third aspect of the present invention provides a fittable and releasable fastener, comprising: a head and a fitting and releasing piece. The head has at least one fitted and released portion and a fastening portion; and the fitting and releasing piece has at least one fitting and releasing portion, and the fitting and releasing portion fits to the fitted and released portion, the fitting and releasing piece or the head is applied with an external force to make the fitting and releasing portion release the fitted and released portion for limiting the force or the force interval applied on the fastening portion, the fastening portion is used to fasten a corresponding fastened portion, and when the force is applied to the head to drive the fastening portion for the locking or fastening, the fitting and releasing portion releases the fitted and released portion along a fitting and releasing surface before the torque force or turning force applied to the fastening portion is larger than a bearable or predetermined structural force on the corresponding fastened portion to prevent the corresponding fastened portion or the fastening portion from being damaged or failure.

A fourth aspect of the present invention provides a fittable and releasable fastener, comprising: a head and a fitting and releasing piece. The head has at least one fitted and released portion and a fastening portion, the head has a limiting portion, and the limiting portion combines moveably with a corresponding limiting portion provided by a body portion; and the fitting and releasing piece has at least one fitting and releasing portion, and the fitting and releasing portion fits to the fitted and released portion, the fitting and releasing piece or the head is applied with an external force to make the fitting and releasing portion release the fitted and released portion for limiting the force or the force interval applied on the fastening portion, the fastening portion is used to fasten a corresponding fastened portion, and when the force is applied to the head to drive the fastening portion, the fitting and releasing portion releases the fitted and released portion before the torque force or turning force applied to the fastening portion is larger than a predetermined force on the fastening portion.

A fifth aspect of the present invention provides a fittable and releasable fastener, comprising: a head and a fitting and releasing piece. The head has at least one fitted and released portion and a first combining portion. The fitting and releasing piece has at least one fitting and releasing portion and a second combining portion. The head combines moveably with the fitting and releasing piece, and the fitting and releasing portion can perform fitting and releasing with the fitted and released portion. The first combining portion or the second combining portion has a receiving space, and the first combining portion or the second combining portion can be pressed by an external force for allowing the material of an object or another object to enter or flow into the receiving space so as to combine with the object or the another object.

A sixth aspect of the present invention provides a fittable and releasable fastener, comprising: a head and a fitting and releasing piece. The head has at least one fitted and released portion and a first combining portion. The fitting and releasing piece has at least one fitting and releasing portion and a second combining portion. The head combines moveably with the fitting and releasing piece, and the fitting and releasing portion can perform fitting and releasing with the fitted and released portion. The first combining portion or the second combining portion is used to be pressed by an external force to form a receiving space for allowing the receiving space to lock the object or the another object so as to combine with the object or the another object.

A seventh aspect of the present invention provides a fittable and releasable fastener, comprising: the fittable and releasable fastener being placed in a carrier. A tool is used to pick up the fittable and releasable fastener from the carrier. After an assembly position of the fittable and releasable fastener and an object is compared through a comparison device, the fittable and releasable fastener is placed in the assembly position of the object.

An eighth aspect of the present invention provides a fittable and releasable fastener, comprising: a head and a fitting and releasing piece. The head has at least one fitted and released portion and a first combining portion. The fitting and releasing piece has at least one fitting and releasing portion and a second combining portion. The head combines moveably with the fitting and releasing piece, and the first combining portion and the second combining portion are respectively used to combine with an object and another object, and the fittable and releasable fastener is turned to make the fitting and releasing portion perform fitting and releasing with the fitted and released portion.

In an embodiment, the fittable and releasable fastener has a shaft portion, and the head combines moveably with the fitting and releasing piece by the shaft portion to make the head or the fitting and releasing piece turn against the shaft portion so that the fitting and releasing portion can perform fitting and releasing with the fitted and released portion.

In an embodiment, the first combining portion or the second combining portion has a weldable surface, and the object or the another object has a soldering tin layer. The weldable surface and the soldering tin layer can be heated to perform welding, and the object or the another object is a circuit board.

In an embodiment, the comparison device is an image comparison device, distance comparison device or computer comparison device.

In an embodiment, the head or the fitting and releasing piece has an assembly positioning portion, and the assembly positioning portion can define the position of the fitted and released portion of the head or the fitting and releasing portion of the fitting and releasing piece as a damping position or a limit of direction.

In an embodiment, the fitting and releasing portion or the fitted and released portion has a fitting and releasing surface and a stopping surface, a direction of the fitting and releasing surface is fittably and releasably turning, and a direction of the stopping surface is restrained from turning, or a force toward the direction of the stopping surface for fittably and releasably turning is enlarged.

To achieve at least the above objective, the present disclosure provides a fittable and releasable fastener, when the fitting and releasing portion fits to the fitted and released portion, an external turning force is applied to the fitting and releasing piece to make the fastening portion combine with at least one object. After the fastening portion is combined with the object, the fitting and releasing portion would release the fitted and released portion to limit the force or the force interval applied on the fastening portion for preventing excessively locking if the force is continuously applied.

DETAILED DESCRIPTION OF THE INVENTION

To facilitate understanding of the object, characteristics and effects of this present disclosure, embodiments together with the attached drawings for the detailed description of the present disclosure are provided.

Figure 1:
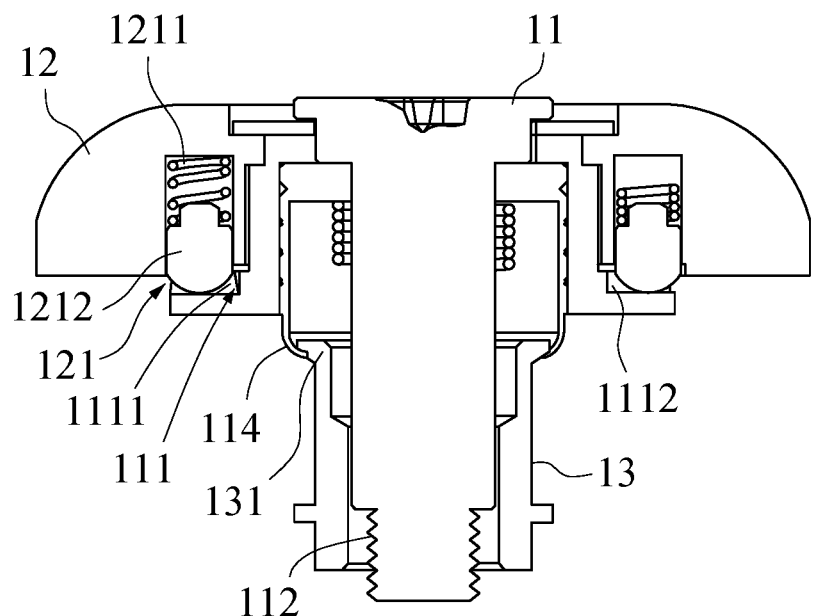
FIG. 1 is a schematic view of sectional state illustrating a fittable and releasable fastener according to the first embodiment of the present disclosure.
Figure 2:
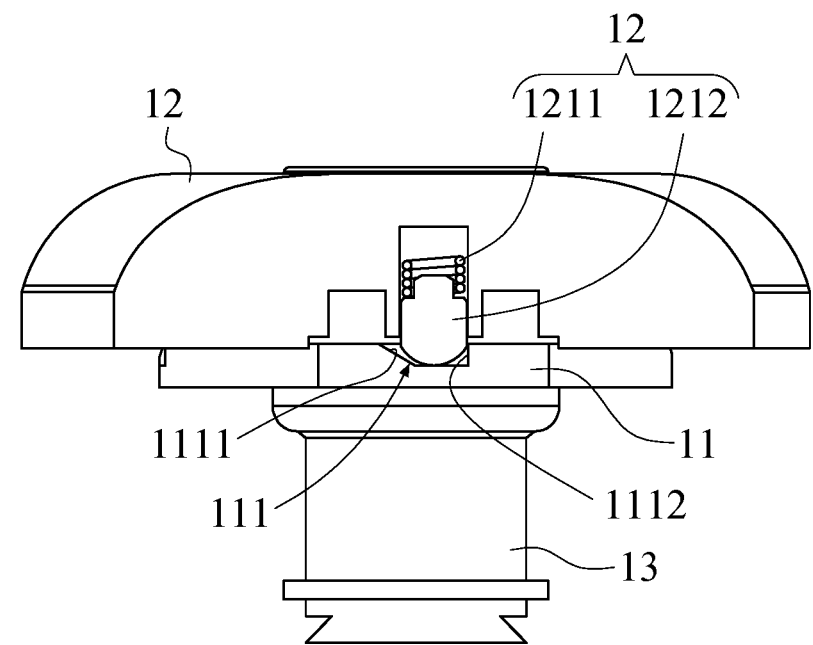
FIG. 2 is a schematic view of sectional state illustrating a fittable and releasable fastener according to the second embodiment of the present disclosure.

Referring to FIGS. 1 and 2, as shown in the drawings, the invention provides a fittable and releasable fastener 1 comprising a head 11 and a fitting and releasing piece 12.

The head 11 has at least one fitted and released portion 111 and a fastening portion 112. The head 11 and the fastening portion 112 are integrally formed. The head 11 has a limiting portion 114, and the limiting portion 114 combines moveably with a corresponding limiting portion 131 provided by a body portion 13.

The fitting and releasing piece 12 has at least one fitting and releasing portion 121, and the fitting and releasing portion 121 fits to the fitted and released portion 111. The fitting and releasing piece 12 (or the head 11) is applied with an external force to make the fitting and releasing portion 121 release the fitted and released portion 111 for limiting the force or the force interval applied on the fastening portion 112. In an embodiment of the invention, the fitting and releasing portion 121 may be a convex body, the fitted and released portion 111 may be a concave body, and the fastening portion 112 may be a thread body. In addition, the number of the fitting and releasing portion 121 and the fitted and released portion 111 may be one or more.

In addition, a second aspect of the invention provides a fitting and releasing method of a fittable and releasable fastener 1 which comprises steps as follows: providing a fittable and releasable fastener 1, which includes a head 11 and a fitting and releasing piece 12, the head 11 has at least one fitted and released portion 111 and a fastening portion 112, the fitting and releasing piece 12 has at least one fitting and releasing portion 121, and the fitting and releasing portion 121 fits to the fitted and released portion 111; and applying an external force to the fitting and releasing piece 12 (or the head 11) to deform the fitting and releasing portion 121 or the fitted and released portion 111 to release each other for limiting the force or the force interval that is applied on the fastening portion 112 by the fitted and released portion 111, the fastening portion 112 is used to fasten a corresponding fastened portion (not shown in the drawings), and when the force is applied to the head 11 to drive the fastening portion 112, the fitting and releasing portion 121 would release the fitted and released portion 111 before the torque force or turning force applied to the fastening portion 112 is larger than a predetermined force on the fastening portion 112.

When the fittable and releasable fastener 1 of the invention is in use, it can be used to combine at least two objects (not shown in the drawings). When two objects are combined, the fastening portion 112 is aligned with a screw hole of the object, and an external turning force is applied to the fitting and releasing piece 12 to make the fastening portion 112 screw into the two objects for combining under the circumstance of the fitting and releasing portion 121 fitting to the fitted and released portion 111. After the fastening portion 112 is combined with the object, the fitting and releasing portion 121 would release the fitted and released portion 111 to deform the fitting and releasing piece 12 if the force is continuously applied to the fitting and releasing piece 12, and after the fitting and releasing portion 121 fits to the fitted and released portion 111 again to revert the fitting and releasing piece 12 to the original state for limiting the force or the force interval applied on the fastening portion 112 to prevent excessively locking.

In an embodiment of the invention, the number of the fitting and releasing portion 121 and the fitted and released portion 111 of the fittable and releasable fastener 1 may be two, the fitted and released portion 111 is provided on the top surface of the head 11, and the fitting and releasing portion 121 is provided on the bottom of the fitting and releasing piece 12. The fitting and releasing portion 121 of the fitting and releasing piece 12 comprises an elastomer 1211 and a pusher 1212, the fitted and released portion 111 of the head 11 is a groove, and the fitted and released portion 111 has a fitting and releasing surface 1111 and a stopping surface 1112. Because the fitting and releasing surface 1111 and the stopping surface 1112 have different angles, when the pusher 1212 is fitted to or removed from the fitted and released portion 111, the fitting and releasing surface 1111 and the stopping surface 1112 with different angles can produce different turning forces which can drive the force for the fastening portion 112 screwing into an object smaller than the force for the pusher 1212 removing the fitted and released portion 111 so that a direction of the fitting and releasing surface 1111 may allow the pusher 1212 to pass and the head 11 is fittably and releasably turning, and a direction of the stopping surface 1112 may limit the pusher 1212 and the head 11 is restrained from turning. Also, the pusher 1212 may be an arc surface body, spherical body or curved surface body, and can be driven or turned by a less force along a bevel, curved surface or arc surface of the fitting and releasing surface 1111. The stopping surface 1112 is a vertical surface, step surface or a bevel, curved surface or arc surface with an angle larger than that of the fitting and releasing surface 1111 for stopping and restraining the pusher 1212 from turning, or restraining the pusher 1212 from moving with a force larger than that of the pusher 1212 driving the fitting and releasing surface 1111. When a force is applied to the head 11 to drive the fastening portion 112 for removing the locking or fastening, the fitting and releasing portion 121 would release the fitted and released portion 111 along the fitting and releasing surface 1111 before the torque force or turning force applied to the fastening portion 112 is larger than a predetermined force on the fastening portion 112. Accordingly, the force or the force interval applied on the fastening portion 112 also can be limited to prevent excessively locking, and the invention can further meet the requirement of practical application.

Moreover, the direction of the fitting and releasing surface 1111 is fittably and releasably turning, and the direction of the stopping surface 1112 is restrained from turning. Besides, a force toward the direction of the stopping surface 1112 for fittably and releasably turning can be enlarged as needed, and the invention can further meet the requirement of practical application.

In addition, the fitting and releasing surface 1111 is a bevel, curved surface, arc surface, step surface, plane or surface of revolution. Also, the fitted and released portion 111 may comprise an elastomer and a pusher, the fitting and releasing portion 121 of the fitting and releasing piece 12 is a groove, and the fitting and releasing portion 121 has a fitting and releasing surface and a stopping surface (not shown in the drawings). Accordingly, the invention can further meet the requirement of practical application.

It is found from the above that the fastening portion 112 is used to fasten the corresponding fastened portion (not shown in the drawings). When the force is applied to the head 11 to drive the fastening portion 112 for the locking or fastening, the fitting and releasing portion 121 would release the fitted and released portion 111 along the fitting and releasing surface 1111 before the torque force or turning force applied to the fastening portion 112 is larger than a bearable structural force on the corresponding fastened portion to prevent the corresponding fastened portion from being damaged by the fastening portion 112 or failure.

In addition, When a force is applied to the head 11 to drive the fastening portion 112 for removing the locking or fastening, the fitting and releasing portion 121 would abut against the stopping surface 1112 so that the torque force or turning force applied to the fastening portion 112 is transferred to the stopping surface 1112 by the fitting and releasing portion 121 for removing the locking or fastening of the fastening portion 112 to the corresponding fastened portion. Also, when the torque force or turning force applied to the fastening portion 112 is transferred to the stopping surface 1112 by the fitting and releasing portion 121, the force transferred to the stopping surface 1112 is larger than the fitting and releasing force of entering for lockably fastening or turnably fastening the fitting and releasing portion 121 and the fitted and released portion 111 in another direction, for removing the locking or fastening of the fastening portion 112 to the corresponding fastened portion.

Referring to FIG. 2, as shown in the drawing, in the embodiment, the number of the fitting and releasing portion 121 and the fitted and released portion 111 of the fittable and releasable fastener 1 may be one, the fitted and released portion 111 is provided at two sides of the head 11, and the fitting and releasing portion 121 is provided at two sides of the bottom of the fitting and releasing piece 12. In addition, the fitted and released portion 111 has a fitting and releasing surface 1111 and a stopping surface 1112, and the fitting and releasing portion 121 of the fitting and releasing piece 12 comprises an elastomer 1211 and a pusher 1212. The direction of the fitting and releasing surface 1111 may allow the pusher 1212 to pass and the head 11 is fittably and releasably turning, and the direction of the stopping surface 1112 may limit the pusher 1212 and the head 11 is restrained from turning. Accordingly, the invention can further meet the requirement of practical application.

Figure 3:
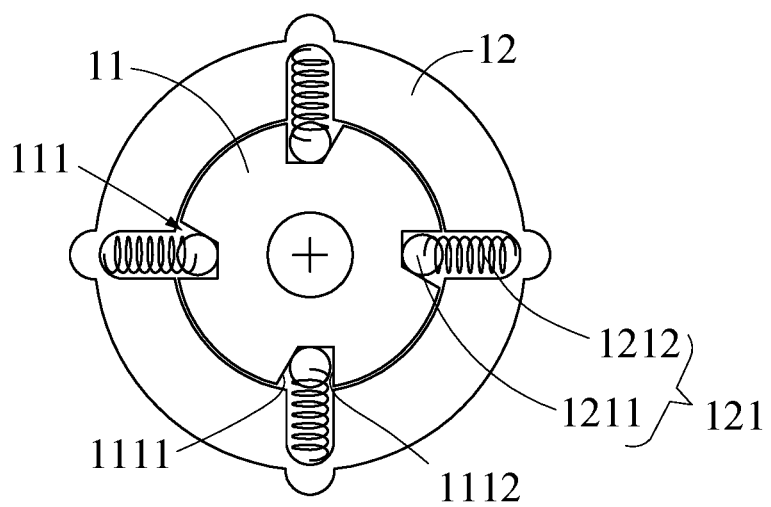
FIG. 3 is a schematic top view illustrating a fittable and releasable fastener according to the third embodiment of the present disclosure.
Figure 4:
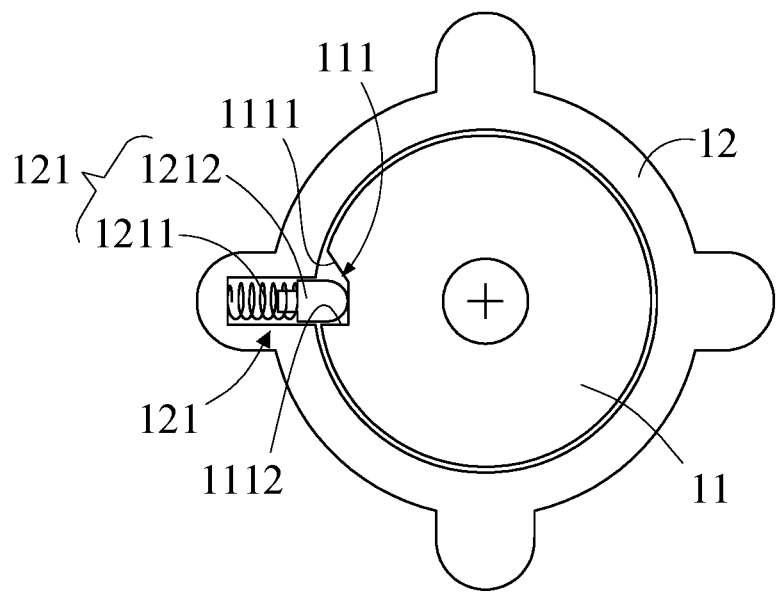
FIG. 4 is a schematic top view illustrating a fittable and releasable fastener according to the fourth embodiment of the present disclosure.

Referring to FIGS. 3 and 4, as shown in the drawings, in the embodiment, the number of the fitting and releasing portion 121 and the fitted and released portion 111 of the fittable and releasable fastener 1 may be four (shown as FIG. 3), or the number of the fitting and releasing portion 121 and the fitted and released portion 111 of the fittable and releasable fastener 1 may be one (shown as FIG. 4), the fitted and released portion 111 has a fitting and releasing surface 1111 and a stopping surface 1112, and the fitting and releasing portion 121 of the fitting and releasing piece 12 comprises an elastomer 1211 and a pusher 1212. The direction of the fitting and releasing surface 1111 may allow the pusher 1212 to pass and the head 11 is fittably and releasably turning, and the direction of the stopping surface 1112 may limit the pusher 1212 and the head 11 is restrained from turning. Accordingly, the invention can further meet the requirement of practical application.

Figure 5:
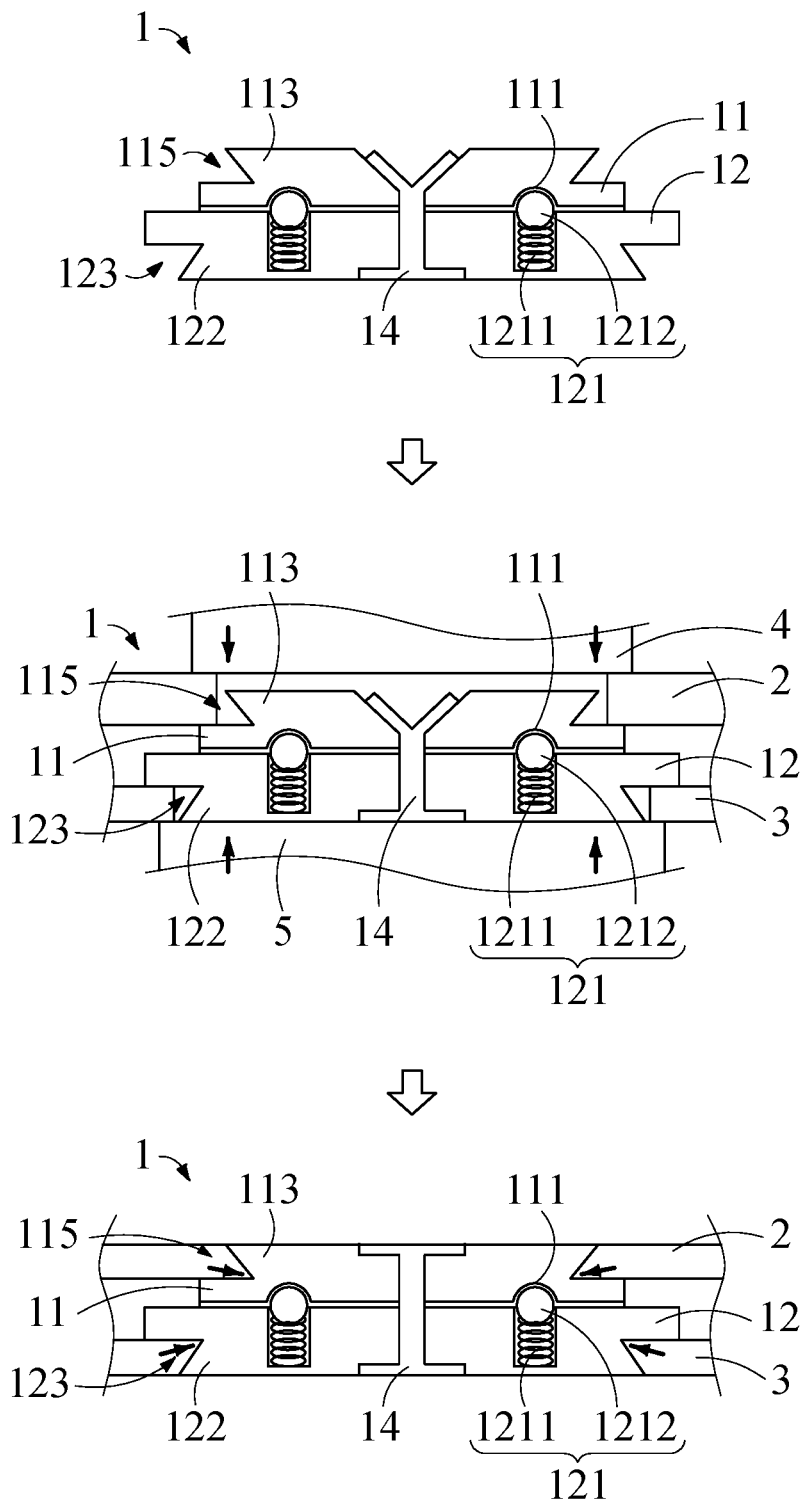
FIG. 5 is a schematic view of state in use illustrating a fittable and releasable fastener according to the fifth embodiment of the present disclosure.

Referring to FIG. 5, as shown in the drawing, the difference between the embodiment and the above embodiments is that the head 11 has at least one fitted and released portion 111 and a first combining portion 113. The fitting and releasing piece 12 has at least one fitting and releasing portion 121 and a second combining portion 122. The head 11 combines moveably with the fitting and releasing piece 12, and the fitting and releasing portion 121 can perform fitting and releasing with the fitted and released portion 111. Each of the first combining portion 113 and the second combining portion 122 respectively has a receiving space 115, 123, and the receiving space 115, 123 of the first combining portion 113 or the second combining portion 122 can be pressed by an external force for allowing the materials of an object 2 and another object 3 to enter or flow into the receiving spaces 115, 123 so that the fittable and releasable fastener 1 can combine with the object 2 and the another object 3.

When the fittable and releasable fastener 1 of the invention is assembled, it can be used to combine the object 2 and the another object 3. When the fittable and releasable fastener 1 performs the combination of the object 2 and the another object 3, the object 2 and the another object 3 can be respectively corresponded to the first combining portion 113 of the head 11 and the second combining portion 122 of the fitting and releasing piece 12, and then tools 4, 5 are respectively applied an external force to press the object 2 and the another object 3 for allowing the materials of the object 2 and the another object 3 to respectively enter or flow into the receiving spaces 115, 123 so that the fittable and releasable fastener 1 can combine with the object 2 and the another object 3, and thus the effect of firmly setting up the head 11 and the fitting and releasing piece 12 of the fittable and releasable fastener 1 on the object 2 and the another object 3 can be achieved.

When the fittable and releasable fastener 1 of the invention is in use, a turning external force can be applied to the object 2 or the another object 3 to make the object 2 or the another object 3 turn the head 11 or the fitting and releasing piece 12 of the fittable and releasable fastener 1 so that the fitting and releasing portion 121 of the fitting and releasing piece 12 can perform fitting and releasing with the fitted and released portion 111 of the head 11 for limiting the force or the force interval applied to turn the object 2 or the another object 3 to make the fittable and releasable fastener 1 use the fitting and releasing portion 121 of the fitting and releasing piece 12 and the fitted and released portion 111 of the head 11 to prevent excessively locking.

In a preferred embodiment of the invention, the fittable and releasable fastener 1 has a shaft portion 14, and the head 11 combines moveably with the fitting and releasing piece 12 by the shaft portion 14 to make the head 11 or the fitting and releasing piece 12 turn against the shaft portion 14 so that the fitting and releasing portion 121 can perform fitting and releasing with the fitted and released portion 111.

Figure 6:
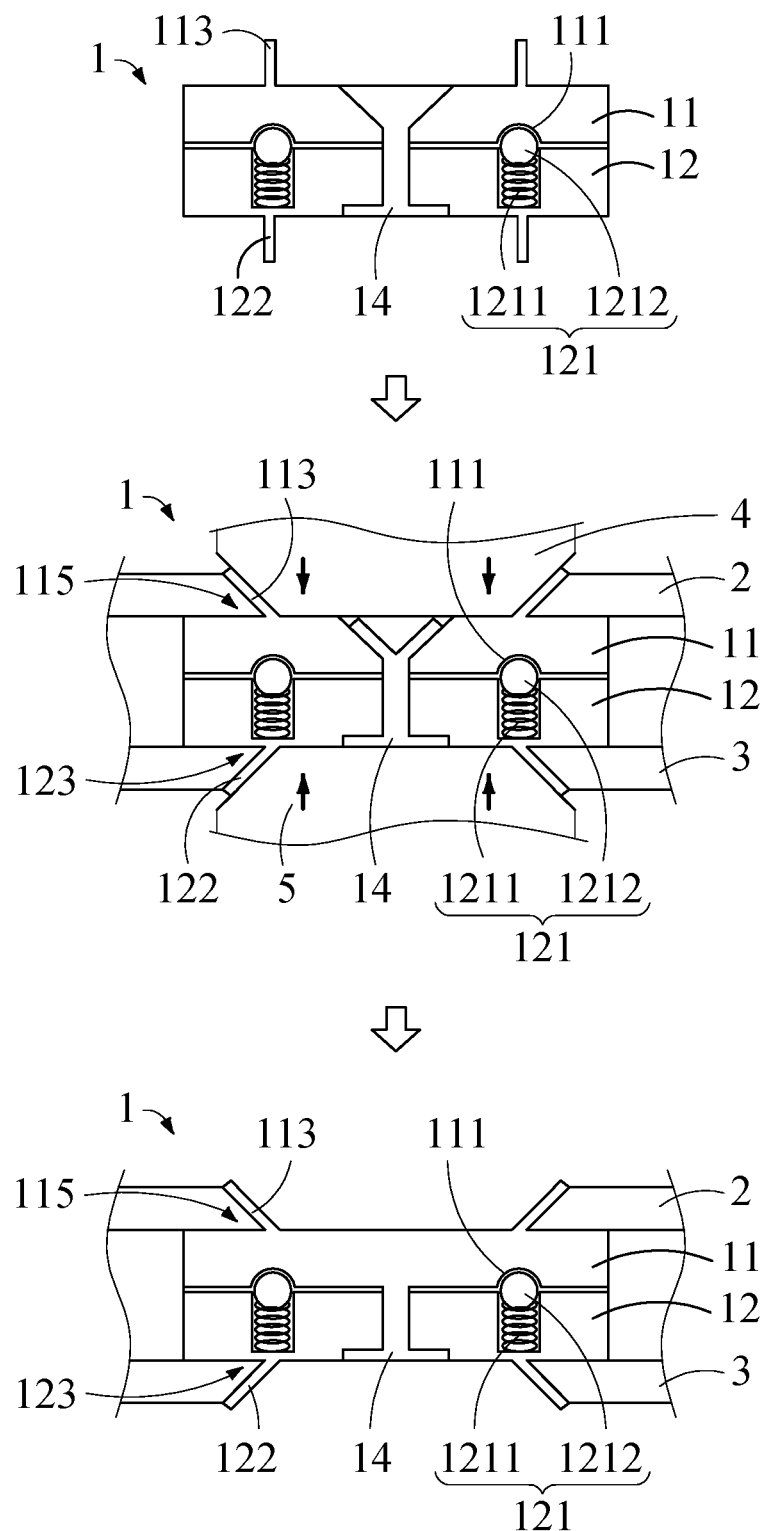
FIG. 6 is a schematic view of state in use illustrating a fittable and releasable fastener according to the sixth embodiment of the present disclosure.

Referring to FIG. 6, as shown in the drawing, the difference between the embodiment and the above embodiments is that the first combining portion 113 and the second combining portion 122 are used to be pressed by tools 4, 5 to make the first combining portion 113 and the second combining portion 122 respectively form the receiving spaces 115, 123 for allowing the receiving spaces 115, 123 to lock the object 2 and the another object 3 so that the fittable and releasable fastener 1 can combine with the object 2 and the another object 3, and thus the effect of firmly setting up the head 11 and the fitting and releasing piece 12 of the fittable and releasable fastener 1 on the object 2 and the another object 3 can be achieved.

Figure 7:
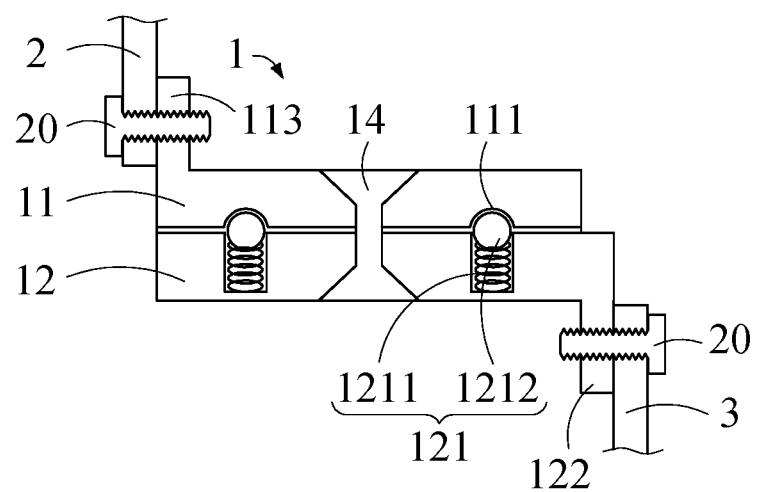
FIG. 7 is a schematic view of state in use illustrating a fittable and releasable fastener according to the seventh embodiment of the present disclosure.

Referring to FIG. 7, as shown in the drawing, the difference between the embodiment and the above embodiments is that each of the first combining portion 113 and the second combining portion 122 is a locking platform respectively for allowing the first combining portion 113 and the second combining portion 122 to respectively combine the object 2 and the another object 3 by bolt elements 20, 30, and thus the effect of firmly setting up the head 11 and the fitting and releasing piece 12 of the fittable and releasable fastener 1 on the object 2 and the another object 3 can be achieved.

Figure 8:
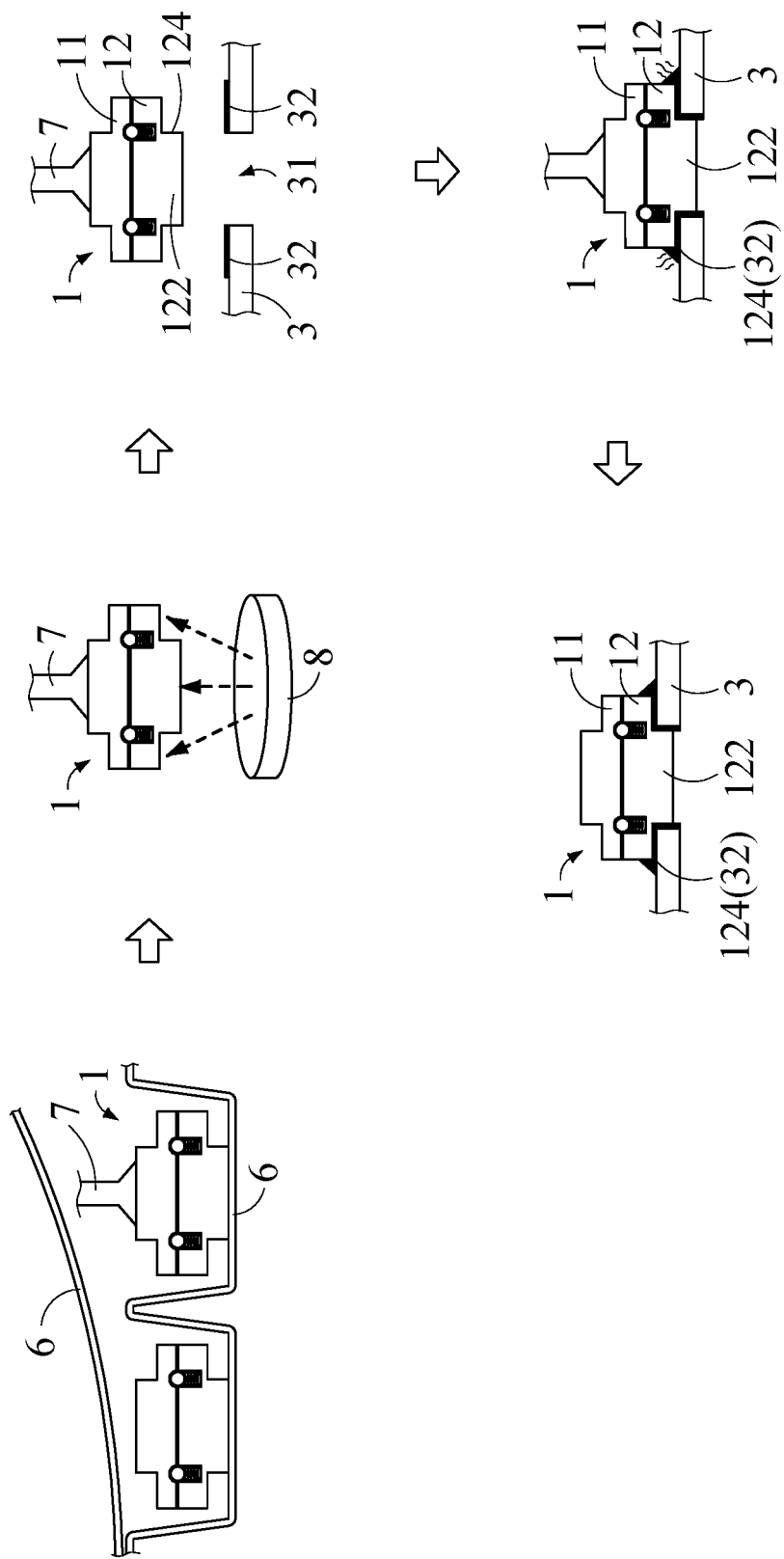
FIG. 8 is a schematic view of state in use illustrating a fittable and releasable fastener according to the eighth embodiment of the present disclosure.

Referring to FIG. 8, as shown in the drawing, the difference between the embodiment and the above embodiments is that the fittable and releasable fastener 1 is placed in a carrier 6, the carrier 6 has a cover 61, and the cover can close the fittable and releasable fastener 1 in the carrier 6.

When the fittable and releasable fastener 1 is assembled, the cover 61 can be opened so that a tool 7 picks up the fittable and releasable fastener 1 from the carrier 6. After an assembly position of the fittable and releasable fastener 1 and the another object 3 (or the object 2) is compared through a comparison device 8, the fittable and releasable fastener 1 is placed in the assembly position of the another object 3 (or the object 2), for example, the second combining portion 122 (or the first combining portion 113) is correspondingly placed to a through hole portion 31 of the another object 3 (or the object 2), and thus the effect of precisely setting up the fittable and releasable fastener 1 can be achieved.

In a preferred embodiment of the invention, the second combining portion 122 (or the first combining portion 113) has a weldable surface 124, and the another object 3 (or the object 2) has a soldering tin layer 32. The second combining portion 122 (or the first combining portion 113) is correspondingly placed in the through hole portion 31 of the another object 3 (or the object 2), and then the weldable surface 124 and the soldering tin layer 32 are heated to perform welding, and thus the effect of firmly setting up the fitting and releasing piece 12 (or the head 11) of the fittable and releasable fastener 1 on the another object 3 (or the object 2) can be achieved.

In a preferred embodiment of the invention, the another object 3 (or the object 2) may be a circuit board, and the comparison device 8 may be an image comparison device, distance comparison device or computer comparison device. Accordingly, the invention can further meet the requirement of practical application.

Figure 9:
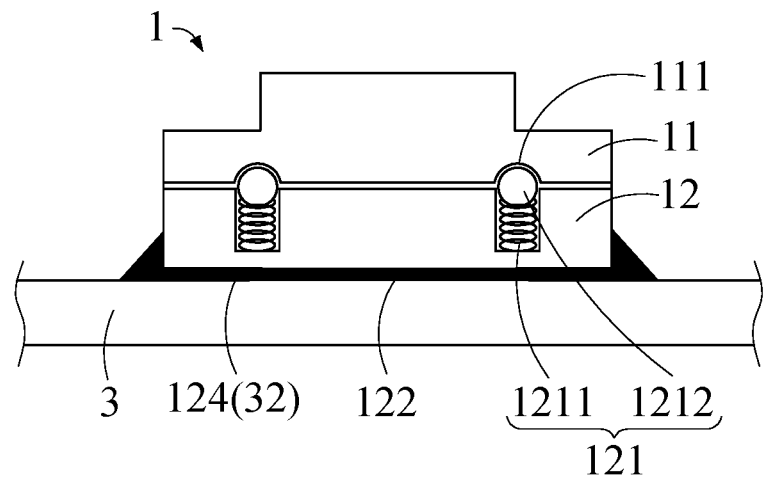
FIG. 9 is a schematic view of state in use illustrating a fittable and releasable fastener according to the ninth embodiment of the present disclosure.

Referring to FIG. 9, as shown in the drawing, the difference between the embodiment and the above embodiments is that the second combining portion 122 (or the first combining portion 113) is a plane. The second combining portion 122 (or the first combining portion 113) is correspondingly placed on a surface of the another object 3 (or the object 2), and then the weldable surface 124 and the soldering tin layer 32 are heated to perform welding, and thus the effect of firmly setting up the fitting and releasing piece 12 (or the head 11) of the fittable and releasable fastener 1 on the another object 3 (or the object 2) can be achieved.

Figure 10:
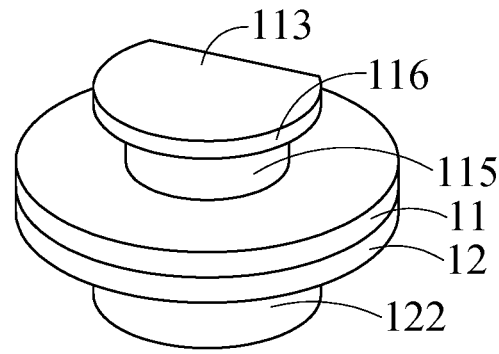
FIG. 10 is a schematic external view illustrating a fittable and releasable fastener according to the tenth embodiment of the present disclosure.
Figure 11:
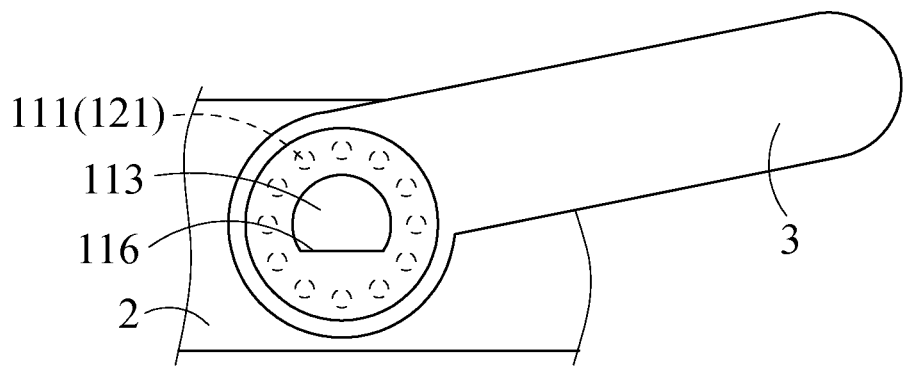
FIG. 11 is a schematic view of state in use illustrating a fittable and releasable fastener according to the tenth embodiment of the present disclosure.

Referring to FIGS. 10 and 11, as shown in the drawings, the difference between the embodiment and the above embodiments is that the first combining portion 113 of the head 11 (or the second combining portion 122 of the fitting and releasing piece 12) has an assembly positioning portion 116, and the assembly positioning portion 116 can define the position of the fitted and released portion 111 of the head 11 (or the fitting and releasing portion 121 of the fitting and releasing piece 12) as a damping position or a limit of direction.

While the present disclosure has been described by means of specific embodiments, numerous modifications and variations could be made thereto by those skilled in the art without departing from the scope and spirit of the present disclosure set forth in the claims.

What is claimed is:

1. A fittable and releasable fastener, comprising:
   a head, having at least one fitted and released portion and a first combining portion; and
   a fitting and releasing piece, having at least one fitting and releasing portion and a second combining portion, the head combining moveably with the fitting and releasing piece, and the fitting and releasing portion performing fitting and releasing with the fitted and released portion, the first combining portion or the second combining portion having a receiving space, and the first combining portion or the second combining portion being pressed by an external force for allowing the material of an object or another object to enter or flow into the receiving space so as to combine with the object or the another object.

2. The fittable and releasable fastener according to claim 1, wherein the fittable and releasable fastener has a shaft portion, and the head combines moveably with the fitting and releasing piece by the shaft portion to make the head or the fitting and releasing piece turn against the shaft portion so that the fitting and releasing portion can perform fitting and releasing with the fitted and released portion.

3. The fittable and releasable fastener according to claim 1, wherein the head or the fitting and releasing piece has an assembly positioning portion, and the assembly positioning portion can define the position of the fitted and released portion of the head or the fitting and releasing portion of the fitting and releasing piece as a damping position or limit of a direction.

4. The fittable and releasable fastener according to claim 1, wherein the fitting and releasing portion or the fitted and released portion has a fitting and releasing surface and a stopping surface, a direction of the fitting and releasing surface is fittably and releasably turning, and a direction of the stopping surface is restrained from turning, or a force toward the direction of the stopping surface for fittably and releasably turning is enlarged.

5. A fittable and releasable fastener, comprising:
   a head, having at least one fitted and released portion and a first combining portion; and
   a fitting and releasing piece, having at least one fitting and releasing portion and a second combining portion, the head combining moveably with the fitting and releasing piece, and the fitting and releasing portion performing fitting and releasing with the fitted and released portion, the first combining portion or the second combining portion being used to be pressed by an external force to form a receiving space for allowing the receiving space to lock the object or the another object so as to combine with the object or the another object.

6. The fittable and releasable fastener according to claim 5, wherein the fittable and releasable fastener has a shaft portion, and the head combines moveably with the fitting and releasing piece by the shaft portion to make the head or the fitting and releasing piece turn against the shaft portion so that the fitting and releasing portion can perform fitting and releasing with the fitted and released portion.

7. The fittable and releasable fastener according to claim 5, wherein the head or the fitting and releasing piece has an assembly positioning portion, and the assembly positioning portion can define the position of the fitted and released portion of the head or the fitting and releasing portion of the fitting and releasing piece as a damping position or limit of a direction.

8. The fittable and releasable fastener according to claim 5, wherein the fitting and releasing portion or the fitted and released portion has a fitting and releasing surface and a stopping surface, a direction of the fitting and releasing surface is fittably and releasably turning, and a direction of the stopping surface is restrained from turning, or a force toward the direction of the stopping surface for fittably and releasably turning is enlarged.

9. A fittable and releasable fastener, the fittable and releasable fastener being placed in a carrier, a tool being used to pick up the fittable and releasable fastener from the carrier, after an assembly position of the fittable and releasable fastener and an object being compared through a comparison device, the fittable and releasable fastener being placed in the assembly position of the object.

10. The fittable and releasable fastener according to claim 9, wherein the fittable and releasable fastener has a shaft portion, and the head combines moveably with the fitting and releasing piece by the shaft portion to make the head or the fitting and releasing piece turn against the shaft portion so that the fitting and releasing portion can perform fitting and releasing with the fitted and released portion.

11. The fittable and releasable fastener according to claim 9, wherein the first combining portion or the second combining portion has a weldable surface, and the object or the another object has a soldering tin layer, the weldable surface and the soldering tin layer can be heated to perform welding, and the object or the another object is a circuit board.

12. The fittable and releasable fastener according to claim 9, wherein the comparison device is an image comparison device, distance comparison device or computer comparison device.

13. The fittable and releasable fastener according to claim 9, wherein the head or the fitting and releasing piece has an assembly positioning portion, and the assembly positioning portion can define the position of the fitted and released portion of the head or the fitting and releasing portion of the fitting and releasing piece as a damping position or limit of a direction.

14. A fittable and releasable fastener, comprising:
a head, having at least one fitted and released portion and a first combining portion; and
a fitting and releasing piece, having at least one fitting and releasing portion and a second combining portion, the head combining moveably with the fitting and releasing piece, the first combining portion and the second combining portion being respectively used to combine with an object and another object, and the fittable and releasable fastener being turned to make the fitting and releasing portion perform fitting and releasing with the fitted and released portion.

15. The fittable and releasable fastener according to claim 14, wherein the fittable and releasable fastener has a shaft portion, and the head combines moveably with the fitting and releasing piece by the shaft portion to make the head or the fitting and releasing piece turn against the shaft portion so that the fitting and releasing portion can perform fitting and releasing with the fitted and released portion.

16. The fittable and releasable fastener according to claim 14, wherein the fitting and releasing portion or the fitted and released portion has a fitting and releasing surface and a stopping surface, a direction of the fitting and releasing surface is fittably and releasably turning, and a direction of the stopping surface is restrained from turning, or a force toward the direction of the stopping surface for fittably and releasably turning is enlarged.

* * * * *